US006934683B2

(12) United States Patent
Ju et al.

(10) Patent No.: US 6,934,683 B2
(45) Date of Patent: Aug. 23, 2005

(54) DISAMBIGUATION LANGUAGE MODEL

(75) Inventors: Yun-cheng Ju, Bellevue, WA (US); Fileno A. Alleva, Redmond, WA (US)

(73) Assignee: Microsoft Corporation, Redmond, CA (US)

( * ) Notice: Subject to any disclaimer, the term of this patent is extended or adjusted under 35 U.S.C. 154(b) by 487 days.

(21) Appl. No.: 09/773,242

(22) Filed: Jan. 31, 2001

(65) Prior Publication Data

US 2002/0128831 A1 Sep. 12, 2002

(51) Int. Cl.[7] .......................... G10L 15/18; G10L 15/14
(52) U.S. Cl. .............................. 704/257; 704/8; 704/9; 704/270; 379/88.01
(58) Field of Search ............................... 704/8, 9, 231, 704/243, 270, 275, 251, 255, 257, 252, 254; 379/88.01, 88.03

(56) References Cited

U.S. PATENT DOCUMENTS

| 5,787,230 | A | * | 7/1998 | Lee | 704/235 |
|---|---|---|---|---|---|
| 6,163,767 | A | * | 12/2000 | Tang et al. | 704/231 |
| 6,321,196 | B1 | * | 11/2001 | Franceschi | 704/243 |
| 6,374,210 | B1 | * | 4/2002 | Chu | 704/9 |
| 6,562,078 | B1 | * | 5/2003 | Yang et al. | 715/535 |
| 6,629,071 | B1 | * | 9/2003 | Mann | 704/251 |

FOREIGN PATENT DOCUMENTS

JP        11167393 A   *  6/1999   ............. G10L/3/00

OTHER PUBLICATIONS

Meteer, M. et al., "Statistical language modeling combining N-gram and context-free-grammars," ICASSP-93.,International Conference on Acoustics, Speech, and Signal Processing, 1993. vol. 2, Apr. 27–30, 1993, pp. 37–40.*
Schneider, "bulletin", Association for Literary and Linguistic Computing, vol. 8(2), pp. 166–174, 1980.
Pao, "A Computer Intelligent System for Understanding Chinese Homonyms", The First International Conference on Computers, IEEE, pp. 841–847, 1984.
Fan et al., "Relaxation Based Word Identification for Removing the Abmiguity in Phonetic Chinese Input", International Journal of Pattern Recognition and Artificial Intelligence, vol. 4, No. 4, pp. 651–666, 1990.
Chien et al., "A New Efficient Chinese Natural Language Processing System with Syllabic Input for Mandarin Dictation Applications", Computer Processing of Chinese & Oriental Languages, vol. 4, No. 4, pp. 352–366, Mar. 1990.
Hori et al., "Object–Oriented Programming Environment for Language Processing in a Speech Understanding System", Journal of Japanese Society for Artificial Intelligence, vol. 6, No. 2, pp. 196–207, Mar. 1991.
Kozima et al., "Disambiguation Model for Text Interpretation Using Knowledge and Context", Transactions of Information Processing Society of Japan, vol. 32, No. 11, pp. 1366–1373, Nov. 1991.
Gu et al, "Markov Modeling of Mandarin Chinese for Decoding the Phonetic Sequence into Chinese Characters", Computer Speech and Language, vol. 5, No. 4, pp. 363–377, Mar. 1986.
Cimino et al., "Knowledge–based Approaches to the Maintenance of a Large Controlled Medical Terminology", JAMIA, vol. 1, No. 1, Jan./Feb. 1994.
Ward et al., "Prosodic Cues to Work Usage", 1995 International Conference on Acoustics, Speech, and Signal Processing,, vol. 1, pp. 620–623, 1995 IEEE.
Vu et al., "The Influence of Global Discourse on Lexical Ambiguity Resolution", Psychonomic Society, Inc., Memory & Cognition, pp. 236–252, 2000.

* cited by examiner

*Primary Examiner*—Susan McFadden
(74) *Attorney, Agent, or Firm*—Westman, Champlin & Kelly, P.A.

(57) ABSTRACT

A language model for a language processing system such as a speech recognition system is formed as a function of associated characters, word phrases and context cues. A method and apparatus for generating the training corpus used to train the language model and a system or module using such a language model is disclosed.

33 Claims, 5 Drawing Sheets

DISAMBIGUATION LANGUAGE MODEL

BACKGROUND OF THE INVENTION

The present invention relates to language modeling. More particularly, the present invention relates to creating and using a language model for minimizing ambiguity such as during character recognition for input speech.

Accurate speech recognition requires more than just an acoustic model to select the correct word spoken by the user. In other words, if a speech recognizer must choose or determine which word has been spoken, if all words have the same likelihood of being spoken, the speech recognizer will typically perform unsatisfactorily. A language model provides a method or means of specifying which sequences of words in the vocabulary are possible, or in general, provides information about the likelihood of various word sequences.

Speech recognition is often considered to be a form of top-down language processing. Two common forms of language processing includes "top-down" and "bottom-up". Top-down language processing begins with the largest unit of language to be recognized, such as a sentence, and processes it by classifying it into smaller units, such as phrases, which in turn, are classified into yet smaller units, such as words. In contrast, bottom-up language processing begins with words and builds therefrom, larger phrases and/or sentences. Both forms of language processing can benefit from a language model.

One common technique of classifying is to use an N-gram language model. Because the N-gram can be trained with a large amount of data, the n-word dependency can often accommodate both syntactic and semantic shallow structure seamlessly. Although the N-gram language model can perform rather well for general dictation, homonyms can create significant errors. A homonym is an element of a language such as character or syllable, that is one of two or more elements that are pronounced alike but have different spellings. For instance, when a user is spelling characters, the speech recognition module can output the wrong character since some characters are pronounced the same. Likewise, the speech recognition module can output the wrong character for different characters that simply sound similar to each other when spoken (e.g. "m" and "n").

The ambiguity problem is particularly prevalent in languages such as Japanese or Chinese, which are written heavily with the Kanji writing system. The characters of these languages are numerous, complicated ideographs that represent sound and meaning. The characters form limited syllables, which in turn, creates a large number of homonyms that significantly lengthens the time necessary to create a document by dictation. In particular, the incorrect homonym characters must be identified in the document and the correct homonym character must then be inserted.

There thus is a continuing need to develop new methods for minimizing ambiguity when homonyms and similar sounding speech having different meanings are spoken. As technology advances and speech recognition is provided in more applications, a more accurate language model must be obtainable.

SUMMARY OF THE INVENTION

Speech recognizers commonly use a language model such as an N-gram language model to improve accuracy. A first aspect of the present invention includes generating a language model that is particularly useful when a speaker is identifying a character or characters (e.g. a syllable), such as when spelling a word. The language model aids in homonym disambiguation as well as when different characters sound similar to each other. The language model is built from a training corpus that comprises associated elements of a character string (which can be a single character), a word phrase (which can be a single word) having the character string and a context cue. Using a list or dictionary of words, the training corpus can be automatically generated by forming a partial sentence or phrase for each of the word phrases that includes the word phrase, the context cue and a character string of the word phrase. In a further embodiment, a phrase is created for each character of the word phrase.

Another aspect of the present invention is a system or module that uses the above-described language model for recognizing characters when spoken. When a character string is spoken in conjunction with the context cue in the associated word phrase, the speech recognition module ascertains that the user is spelling or otherwise identifying characters. The speech recognition module will then output only the identified characters and not the context cue or associated word phrase. In a further embodiment, the speech recognition module compares a recognized character with a recognized word phrase to verify that the correct character has been identified. If the recognized character is not in the recognized word phrase, the character that is outputted is a character of the recognized word phrase.

DETAILED DESCRIPTION OF THE ILLUSTRATIVE EMBODIMENT

Figure 1:
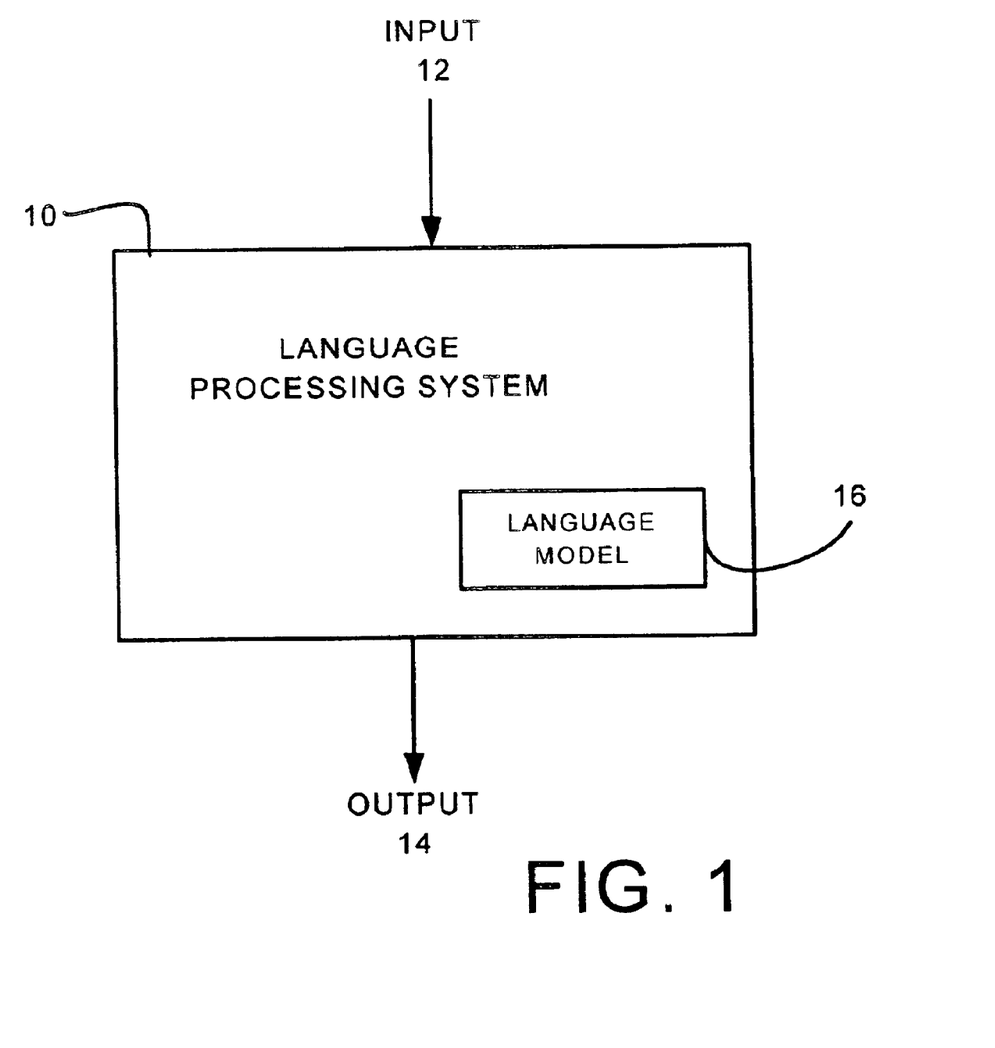
FIG. 1 is a block diagram of a language processing system.

FIG. 1 generally illustrates a language processing system 10 that receives a language input 12 and processes the language input 12 to provide a language output 14. For example, the language processing system 10 can be embodied as a speech recognition system or module that receives as the language input 12 spoken or recorded language by a user. The language processing system 10 processes the spoken language and provides as an output, recognized words and/or characters typically in the form of a textual output.

During processing, the speech recognition system or module 10 can access a language model 16 in order to determine which words, and in particular, which homonym or other similar sounding elements of a language have been spoken. The language model 16 encodes a particular language, such as English, Chinese, Japanese, etc. In the embodiment illustrated, the language model 16 can be a statistical language model, such as an N-gram language model, a context-free grammar, or a hybrid of the same, all of which are well known in the art. One broad aspect of the present invention is a method of creating or building the language model 16. Another broad aspect is using the same in speech recognition.

Figure 2:
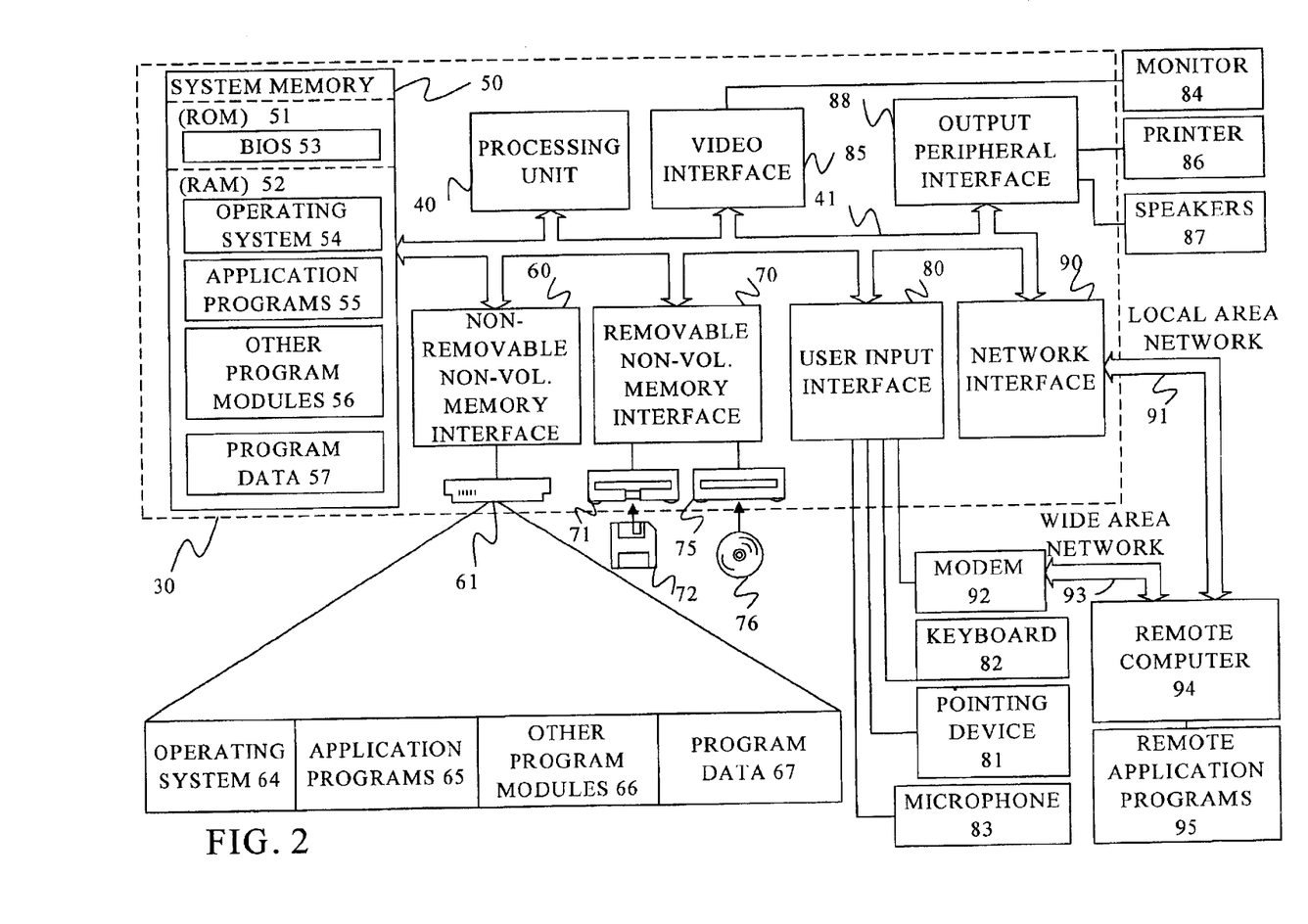
FIG. 2 is a block diagram of an exemplary computing environment.

Prior to a detailed discussion of the present invention, an overview of an operating environment may be helpful. FIG. 2 and the related discussion provide a brief, general description of a suitable computing environment 20 in which the invention can be implemented. The computing system environment 20 is only one example of a suitable computing environment and is not intended to suggest any limitation as to the scope of use or functionality of the invention. Neither should the computing environment 20 be interpreted as having any dependency or requirement relating to any one or combination of components illustrated in the exemplary operating environment 20.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. In addition, the invention may be used in a telephony system.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 2, the exemplary system for implementing the invention includes a general-purpose computing device in the form of a computer 30. Components of computer 30 may include, but are not limited to, a processing unit 40, a system memory 50, and a system bus 41 that couples various system components including the system memory to the processing unit 40. The system bus 41 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 30 typically includes a variety of computer readable mediums. Computer readable mediums can be any available media that can be accessed by computer 30 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 50 includes computer storage media in the form of volatile and/or nonvolatile memory such as read only memory (ROM) 51 and random access memory (RAM) 52. A basic input/output system 53 (BIOS), containing the basic routines that help to transfer information between elements within computer 30, such as during start-up, is typically stored in ROM 51. RAM 52 typically contains data and/or program modules that are immediately accessible to and/or presently being operated on by processing unit 40. By way of example, and not limitation, FIG. 2 illustrates operating system 54, application programs 55, other program modules 56, and program data 57.

The computer 30 may also include other removable/non-removable volatile/nonvolatile computer storage media. By way of example only, FIG. 2 illustrates a hard disk drive 61 that reads from or writes to non-removable, nonvolatile magnetic media, a magnetic disk drive 71 that reads from or writes to a removable, nonvolatile magnetic disk 72, and an optical disk drive 75 that reads from or writes to a removable, nonvolatile optical disk 76 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 61 is typically connected to the system bus 41 through a non-removable memory interface such as interface 60, and magnetic disk drive 71 and optical disk drive 75 are typically connected to the system bus 41 by a removable memory interface, such as interface 70.

The drives and their associated computer storage media discussed above and illustrated in FIG. 2, provide storage of computer readable instructions, data structures, program modules and other data for the computer 30. In FIG. 2, for example, hard disk drive 61 is illustrated as storing operating system 64, application programs 65, other program modules 66, and program data 67. Note that these components can either be the same as or different from operating system 54, application programs 55, other program modules 56, and program data 57. Operating system 64, application programs 65, other program modules 66, and program data 67 are given different numbers here to illustrate that, at a minimum, they are different copies.

A user may enter commands and information into the computer 30 through input devices such as a keyboard 82, a microphone 83, and a pointing device 81, such as a mouse, trackball or touch pad. Other input devices (not shown) may include a joystick, game pad, satellite dish, scanner, or the like. These and other input devices are often connected to the processing unit 40 through a user input interface 80 that is coupled to the system bus, but may be connected by other interface and bus structures, such as a parallel port, game port or a universal serial bus (USB). A monitor 84 or other type of display device is also connected to the system bus 41 via an interface, such as a video interface 85. In addition to the monitor, computers may also include other peripheral output devices such as speakers 87 and printer 86, which may be connected through an output peripheral interface 88.

The computer 30 may operate in a networked environment using logical connections to one or more remote computers, such as a remote computer 94. The remote computer 94 may be a personal computer, a hand-held device, a server, a router, a network PC, a peer device or other common network node, and typically includes many or all of the elements described above relative to the computer 30. The logical connections depicted in FIG. 2 include a local area network (LAN) 91 and a wide area network (WAN) 93, but may also include other networks. Such networking environments are commonplace in offices, enterprise-wide computer networks, intranets and the Internet.

When used in a LAN networking environment, the computer 30 is connected to the LAN 91 through a network interface or adapter 90. When used in a WAN networking environment, the computer 30 typically includes a modem 92 or other means for establishing communications over the WAN 93, such as the Internet. The modem 92, which may be internal or external, may be connected to the system bus 41 via the user input interface 80, or other appropriate mechanism. In a networked environment, program modules depicted relative to the computer 30, or portions thereof, may be stored in the remote memory storage device. By way of example, and not limitation, FIG. 2 illustrates remote application programs 95 as residing on remote computer 94. It will be appreciated that the network connections shown are exemplary and other means of establishing a communications link between the computers may be used.

Figure 3:
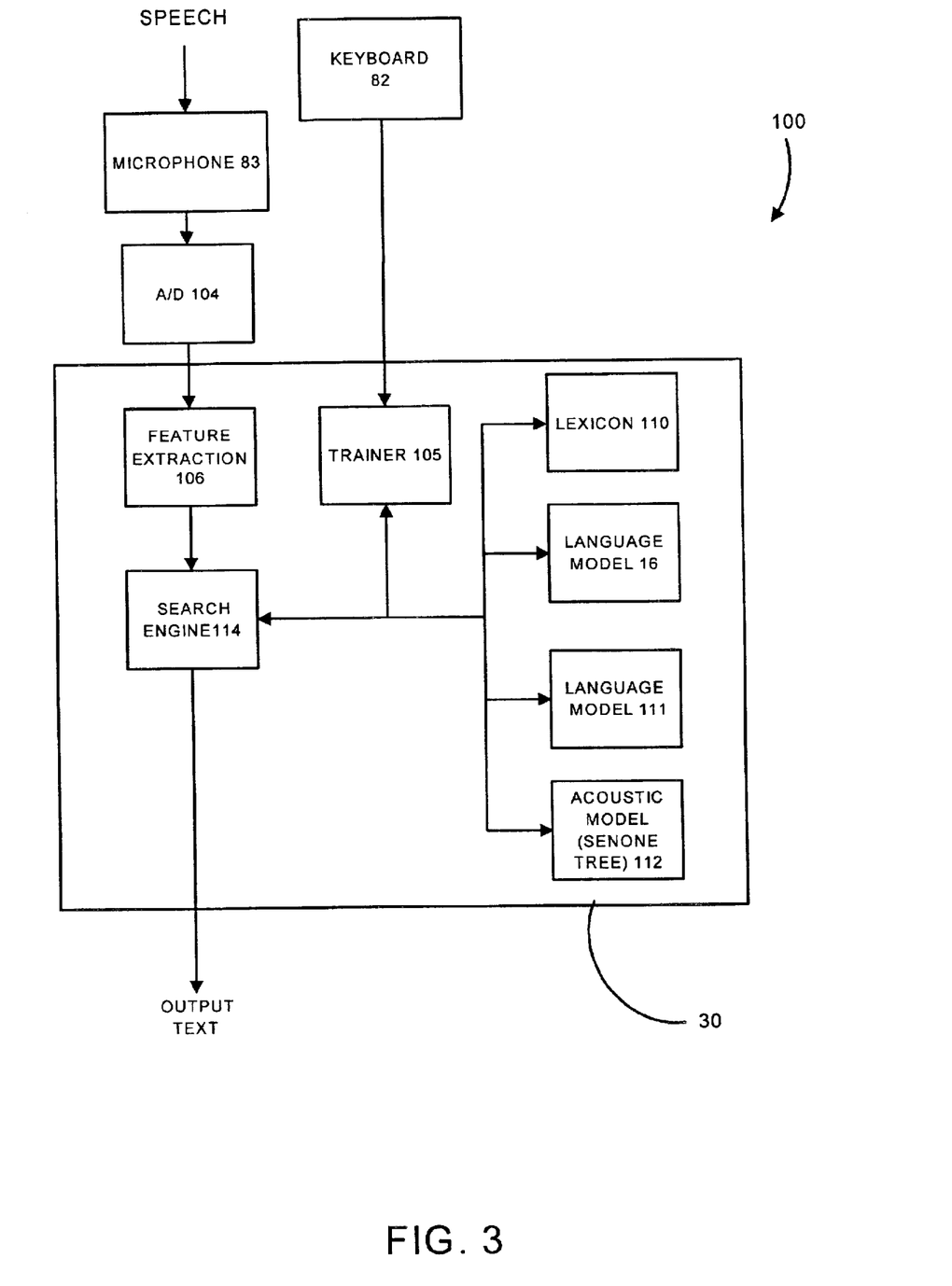
FIG. 3 is a block diagram of an exemplary speech recognition system.

An exemplary embodiment of a speech recognition system 100 is illustrated in FIG. 3. The speech recognition system 100 includes the microphone 83, an analog-to-digital (A/D) converter 104, a training module 105, feature extraction module 106, a lexicon storage module 110, an acoustic model along with senone trees 112, a tree search engine 114, the language model 16 and a general purpose language model 111. It should be noted that the entire system 100, or part of speech recognition system 100, can be implemented in the environment illustrated in FIG. 2. For example, microphone 83 can preferably be provided as an input device to the computer 30, through an appropriate interface, and through the A/D converter 104. The training module 105 and feature extraction module 106 can be either hardware modules in the computer 30, or software modules stored in any of the information storage devices disclosed in FIG. 2 and accessible by the processing unit 40 or another suitable processor. In addition, the lexicon storage module 110, the acoustic model 112, and the language models 16 and 111 are also preferably stored in any of the memory devices shown in FIG. 2. Furthermore, the tree search engine 114 is implemented in processing unit 40 (which can include one or more processors) or can be performed by a dedicated speech recognition processor employed by the computer 30.

In the embodiment illustrated, during speech recognition, speech is provided as an input into the system 100 in the form of an audible voice signal by the user to the microphone 83. The microphone 83 converts the audible speech signal into an analog electronic signal, which is provided to the A/D converter 104. The A/D converter 104 converts the analog speech signal into a sequence of digital signals, which is provided to the feature extraction module 106. In one embodiment, the feature extraction module 106 is a conventional array processor that performs spectral analysis on the digital signals and computes a magnitude value for each frequency band of a frequency spectrum. The signals are, in one illustrative embodiment, provided to the feature extraction module 106 by the A/D converter 104 at a sample rate of approximately 16 kHz.

The feature extraction module 106 divides the digital signal received from the A/D converter 104 into frames that include a plurality of digital samples. Each frame is approximately 10 milliseconds in duration. The frames are then encoded by the feature extraction module 106 into a feature vector reflecting the spectral characteristics for a plurality of frequency bands. In the case of discrete and semi-continuous Hidden Markov Modeling, the feature extraction module 106 also encodes the feature vectors into one or more code words using vector quantization techniques and a codebook derived from training data. Thus, the feature extraction module 106 provides, at its output the feature vectors (or code words) for each spoken utterance. The feature extraction module 106 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi decoding process or similar type of processing technique.

Upon receiving the code words from the feature extraction module 106, the tree search engine 114 accesses information stored in the acoustic model 112. The model 112 stores acoustic models, such as Hidden Markov Models, which represent speech units to be detected by the speech recognition system 100. In one embodiment, the acoustic model 112 includes a senone tree associated with each Markov state in a Hidden Markov Model. The Hidden Markov models represent, in one illustrative embodiment, phonemes. Based upon the senones in the acoustic model 112, the tree search engine 114 determines the most likely phonemes represented by the feature vectors (or code words) received from the feature extraction module 106, and hence representative of the utterance received from the user of the system.

The tree search engine 114 also accesses the lexicon stored in module 110. The information received by the tree search engine 114 based on its accessing of the acoustic model 112 is used in searching the lexicon storage module 110 to determine a word that most likely represents the codewords or feature vector received from the features extraction module 106. Also, the search engine 114 accesses the language models 16 and 111. In one embodiment, the language model 16 is a word N-gram that is used in identifying the most likely character or characters represented by the input speech, which comprises the character (s), the context cue and a word phrase to identify the character(s). For instance, the input speech can be "N as in Nancy", where "N" (which can also be lowercase) is the desired character, "as in" is the context cue and "Nancy" is the word phrase associated with the character "N" so as to clarify or identify the desired character. With respect to the phrase "N as in Nancy", the output of the speech recognition system 100 can be just the character "N". In other words, the speech recognition system 100 upon analyzing the input speech data pertaining to the phrase "N as in Nancy" ascertains that the user has chosen to spell characters. Thus, the context cue and the associated word phrase are omitted from the output text. The search engine 114 can remove the context cue and associated word phrase when necessary.

It should be noted that in this embodiment, the language model 111 is a word N-gram that is used in identifying the most likely word represented by the input speech for general dictation. For example, when the speech recognition system 100 is embodied as a dictation system, the language model 111 provides indications of the most likely word for general dictation; however, when the user uses phrases having a context cue, the output from the language model 16 may have a higher value than that of the language model 111 for the same phrase. The higher value from the language model 16 can be used as an indication in the system 100 that the user is identifying characters with context cues and word phrases. Thus, for an input phrase having a context cue, the search engine 114 or other processing element of the speech recognition system 100 can omit the context cue and word phrase and just output the desired character. Further discussion of use of the language model 16 is provided below.

Although described herein where the speech recognition system 100 uses HMM modeling and senone trees, it should also be understood that this is but one illustrative embodiment. As appreciated by those skilled in the art, the speech recognition system 100 can take many forms and all that is required is that it uses features of the language model 16 and provides as an output the text spoken by the user.

As is well known, a statistical N-gram language model produces a probability estimate for a word given the word sequence up to that word (i.e., given the word history H). An N-gram language model considers only (n−1) prior words in the history H as having any influence on the probability of the next word. For example, a bi-gram (or 2-gram) language model considers the previous word as having an influence on the next word. Therefore, in an N-gram language model, the probability of a word occurring is represented as follows:

$$P(w|H) = P(w|w1, w2, \ldots w(n-1)) \quad (1)$$

where w is a word of interest:
w1 is the word located n−1 positions prior to the word w;
w2 is the word located n−2 positions prior to the word w; and
w(n−1) is the first word prior to word w in the sequence.

Also, the probability of a word sequence is determined based on the multiplication of the probability of each word given its history. Therefore, the probability of a word sequence (w1 . . . wm) is represented as follows:

$$P(w1 \ldots wm) = \prod_{i=1}^{m} (P(w_i | H_i)) \quad (2)$$

The N-gram model is obtained by applying an N-gram algorithm to a corpus (a collection of phrases, sentences, sentence fragments, paragraphs, etc) of textual training data. An N-gram algorithm may use, for instance, known statistical techniques such as Katz's technique, or the binomial posterior distribution backoff technique. In using these techniques, the algorithm estimates the probability that a word w(n) will follow a sequence of words w1, w2, . . . w(n−1). These probability values collectively form the N-gram language model. Some aspects of the invention described below can be applied to building a standard statistical N-gram model.

Figure 4:
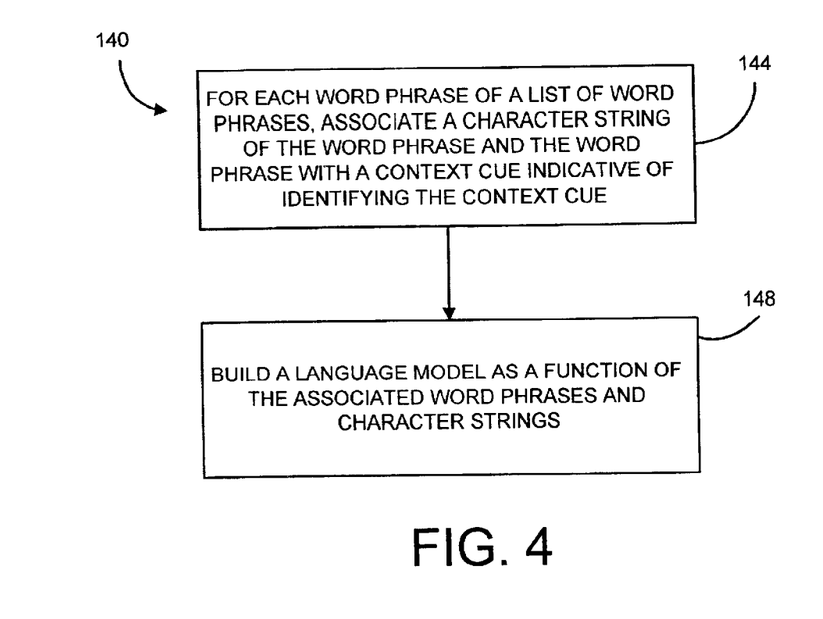
FIG. 4 is a flowchart of a method of the present invention.
Figure 5:
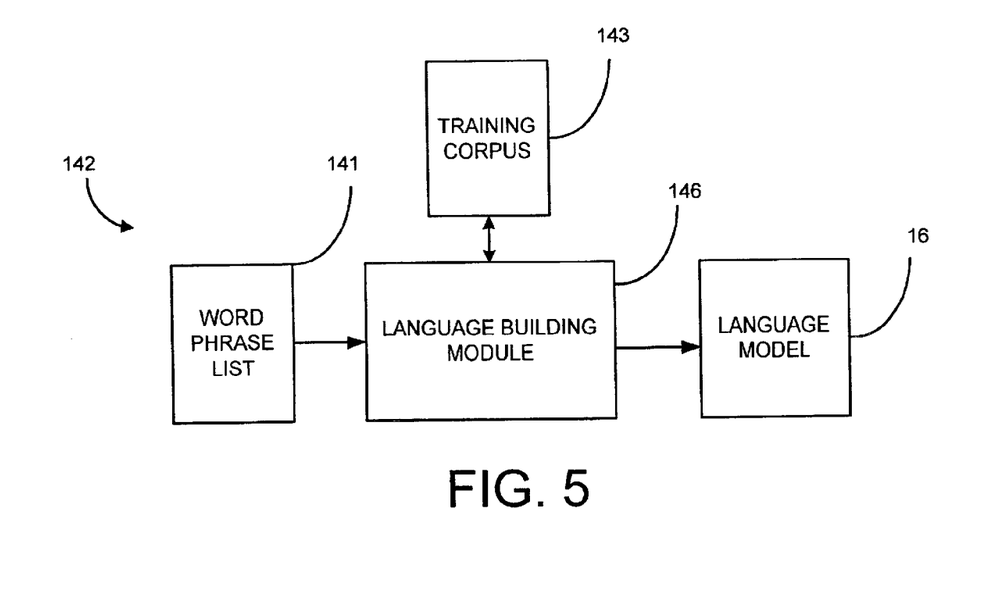
FIG. 5 is a block diagram of modules for implementing the method of FIG. 4.

A first broad aspect of the present invention is illustrated in FIG. 4 as a method 140 for creating a language model for a language processing system to indicate character(s). With reference also to FIG. 5, a system or apparatus 142 includes modules having instructions for implementing method 140. Generally, method 140 includes, for each word phrase of a list of word phrases, associating a character string of the word phrase and the word phrase with a context cue indicative of identifying the character string at step 144. It should be noted that the character string can comprise a single character. Likewise, a word phrase can comprise a single word. For instance, for a character string equal to one character and a word phrase equal to one word, step 144 associates a character of the word with a context cue for each word in the list of words 141. A context cue is generally a word or word phrase in a particular language that is used by a speaker to identify a language element in a word phrase. Examples of context cues in English include "as in", "for example", "as found in", "like", "such as" etc. Similar words or word phrases are found in other languages such as の in Japanese and 的 in Chinese. In one embodiment, step 144 includes building a corpus of word phrases 143. Each word phrase includes a character string, word phrase and context cue. Typically, when a single character is associated with a word, the first character is used, although another character of the word can also be used. Examples of such word phrases include "N as in Nancy", "P as in Paul", and "Z as in zebra".

In a further embodiment, another character of the word is associated with the word and the context cue, while in some languages, such as Chinese where many words include only one, two or three characters, it may be helpful to associate each character of the word with the word in a context cue. As indicated above, a simple way in which to associate the desired character with the corresponding word and context cue is to form a word phrase of the same. Thus, given a list of words 141, a corpus of word phrases 143 for training the language model can be easily generated for all desired context cues.

Based on the corpus 143, the language model 16 is built using a conventional building module 146, such as an N-gram building module, implementing well-known techniques for building the language model 16. Block 148 represents building the language model 16 in method 140, wherein the language model 16 can include, but is not limited to, an N-gram language model, a context-free grammar or a hybrid of the same.

The generated phrases can be assigned a suitable numerical value that will yield an appropriate probability value upon formation of the language model. In the example above, "N as in Nancy" may be more likely to be spoken than the phrase "N as in notch". Accordingly, a further feature of the present invention can include adjusting a probability score for each of the associated character strings and word phrases in the language model. The probability scores can be manually adjusted upon creation of the language model 16. In another embodiment, the probability scores can be adjusted by including in the corpus 143 a sufficient number of identical word phrases to yield an appropriate probability score in the language model for the associated character and word phrases. The probability scores can also be a function of the likelihood of use of the word phrase. Commonly, there exist word phrases that are used more often than others to identify a character or characters. Such word phrases can be assigned or otherwise provided a higher probability score in the language model.

Figure 6:
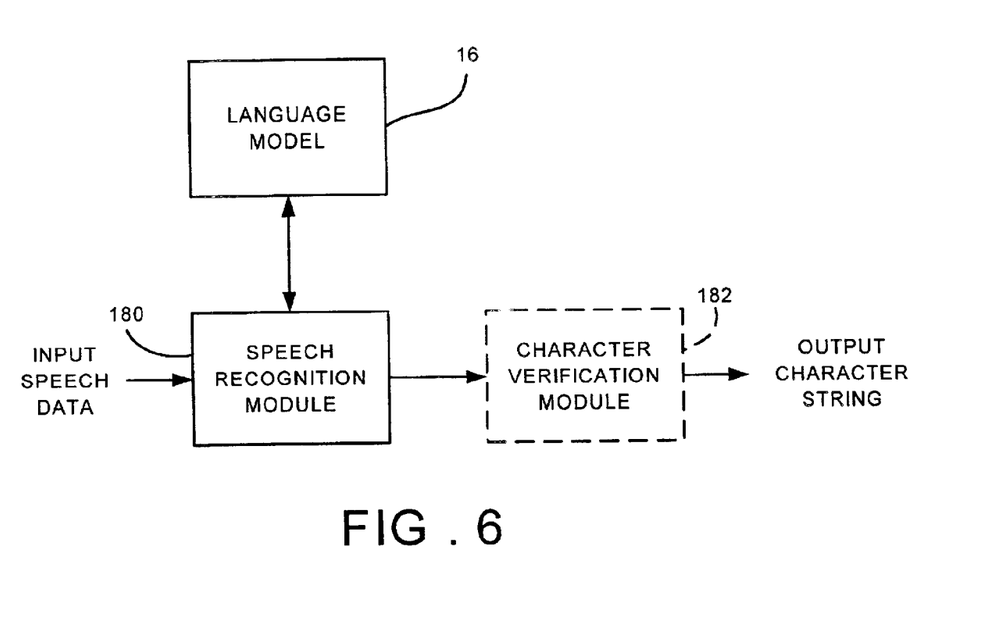
FIG. 6 is a block diagram of a speech recognition module and an optional character verification module.

FIG. 6 generally illustrates a speech recognition module 180 and the language model 16. The speech recognition module 180 can be of the type described above; however, it should be understood that the speech recognition module 180 is not limited to that embodiment in that speech recognition module 180 can take many forms. As indicated above, the speech recognition module 180 receives data indicative of input speech and accesses the language model 16 to ascertain if the input speech includes phrases having context cues. In the event a word phrase having a context cue is detected, the speech recognition module 180 can provide as an output only the character or characters associated with the context cue and word phrase, but not the context cue or word phrase. In other words, although the speech recognition module detected the complete phrase of "N as in Nancy" the speech recognition module only will provide as an output "N". This output is particularly useful in dictation systems where the speaker has chosen to individually indicate the desired character or characters.

At this point, it should be noted that the language model 16 described above consists essentially of associated character strings, word phrases and context cues, thereby allowing the language model 16 to be particularly sensitive to input speech having this form. In the embodiment of FIG. 3, the general purpose language model 111 can thus be used for input speech not having the specific form of character strings, word phrases and context cues. However, it should also be understood that in an alternative embodiment the language model 16 and 111 can be combined, if desired.

Upon receipt of the input speech and access to the language model 16, the speech recognition module 180 determines a recognized character string and a recognized word phrase for the input speech. In many instances, the recognized character string will be correct due to use of the language model 16. However, in a further embodiment, a character verification module 182 can be included to correct at least some of the errors made by the speech recognition module 180. The character verification module 182 has access to the recognized character string and the recognized word phrase ascertained by the speech recognition module 180 and compares the recognized character string to the recognized word phrase, and in particular, verifies that the recognized character string is present in the recognized word phrase. If the recognized character string is not present in the recognized word phrase, it is apparent that an error has occurred, although the error could either originate with the speaker by dictating an incorrect phrase such as "M as in Nancy", or the speech recognition module 180 has misunderstood either the recognized character string or the recognized word phrase. In one embodiment, the character verification module 182 can assume that the error is most likely in the recognized character string, and therefore, substitute character(s) present in the recognized word phrase for the recognized character string. Substitution of the recognized character string with character(s) of the recognized word phrase can be based upon a comparison of acoustic similarity between the recognized character string and the character(s) of the recognized word phrase. Thus, the character verification module 182 can have access to stored data pertaining to the sound of the individual characters when spoken. Using the characters present in the recognized word phrase, the character verification module 182 compares the stored acoustic data of each of the characters in the recognized word phrase with the recognized character string. The closest character(s) is then provided as an output. As appreciated by those skilled in the art, the character verification module 182 can be included in the speech recognition module 180; however, for purposes of explanation, the character verification module 182 has been illustrated separately.

Although the present invention has been described with reference to preferred embodiments, workers skilled in the art will recognize that changes may be made in form and detail without departing from the spirit and scope of the invention.

What is claimed:

1. A method for creating a language model for a speech recognition system to disambiguate characters of an Asian language, the method comprising:
 constructing a training corpus comprising the steps of:
  obtaining a dictionary of word phrases;
  for each word phrase of the dictionary of word phrases comprising Kanji-based characters, associating a character of the word phrase and the word phrase with a context cue indicative of disambiguating the character to automatically generate context cue phrases of the training corpus; and
 using the training corpus to build the language model.

2. The method of claim 1 wherein the language model comprises a statistical language model.

3. The method of claim 2 wherein the language model comprises an N-gram language model having probability information for the generated phrases.

4. The method of claim 2 wherein the language model comprises a context-free grammar.

5. The method of claim 1 wherein each of the characters is a single Kanji-based character.

6. The method of claim 1 wherein associating includes associating a first character of each word phrase with the word phrase.

7. The method of claim 6 wherein associating includes associating another character of at least some of the word phrases, other than the first character, with the corresponding word phrases.

8. The method of claim 7 wherein associating includes associating each character of at least some of the word phrases with the corresponding word phrases.

9. The method of claim 7 wherein associating includes associating each character of each word phrase with the corresponding word phrase.

10. The method of claim 1 and further comprising adjusting a probability score for each of the associated characters and word phrases in the language model.

11. The method of claim 1 wherein each of the word phrases is a single word comprising at least one character.

12. The method of claim 11 wherein each character is a single Kanji-based character.

13. The method of claim 10 wherein the context cue comprises 的 in Chinese.

14. The method of claim 10 wherein the context cue comprises の in Japanese.

15. A computer readable medium having instructions, which when executed by a processor perform a method for recognizing Kanji-based characters when spoken, the method comprising:
 receiving input speech having a context cue phrase, the context cue phrase comprising a Kanji-based character, a word phrase having the Kanji-based character, and a context cue, wherein the context cue is indicative of disambiguating the character;
 detecting the context cue phrase in the received input speech without prompting;
 executing instructions for accessing a language model, wherein the language model comprises an N-gram language model having probability information for the context cue phrases; and outputting the character as text without the word phrase and the context cue for the detected context cue phrase.

16. The computer readable medium of claim 15, wherein outputting the character includes outputting the character string as a function of recognizing the character using the language model.

17. The computer readable medium of claim 15, wherein outputting the character includes outputting the character as only a function of an N-gram of the received input speech.

18. The computer readable medium of claim 15, wherein outputting the character includes outputting the character as a function of a comparison of a recognized character with a recognized word phrase.

19. The computer readable medium of claim 18, wherein when the recognized character is not present in the recognized word phrase, the character that is outputted is a character of the recognized word phrase.

20. The computer readable medium of claim 17, wherein the language model comprises a context-free-grammar.

21. The computer readable medium of claim 15 wherein each of the word phrases is a single word.

22. The computer readable medium of claim 21 wherein each of the characters is a single Kanji-based character.

23. The computer readable medium of claim 15, wherein each of the character is a single Kanji-based character.

24. A computer readable medium having instructions, which when executed by a processor, for recognizing Kanji-based character strings when spoken, the instructions comprising:

a language model indicative of context cue phrases and probability information for the context cue phrases, wherein the context cue phrases consist essentially of associated Kanji-based character strings, word phrases having the character strings and context cues; and a recognition module for receiving data indicative of input speech, the recognition module detecting the presence of context cue phrases in the input speech without prompting indicative of character strings as text, accessing the language model, and outputting a Kanji-based character string as text for at least some detected context cue phrases spoken by the user based on the probability information in the language model.

25. The computer readable medium of claim 24 wherein the recognition module processes detected context cue phrases differently than other input speech by outputting only the character strings in the detected context cue phrases.

26. The computer readable medium of claim 24 wherein the language model comprises a statistical language model.

27. The computer readable medium of claim 24 wherein the language model comprises an N-gram language model.

28. The computer readable medium of claim 24 wherein the language model comprises a context-free-grammar.

29. The computer readable medium of claim 24 wherein the recognition module outputs the character string as a function of a comparison of a recognized character string with a recognized word phrase.

30. The computer readable medium of claim 29 wherein when the recognized character string is not present in the recognized word phrase, the character string that is outputted is a character string of the recognized word phrase.

31. The computer readable medium of claim 24 wherein each of the word phrases is a single word.

32. The computer readable medium of claim 31 wherein each of the character strings is a single character.

33. The computer readable medium of claim 24 wherein each of the character strings is a single character.

* * * * *